United States Patent
Akash

(10) Patent No.: US 10,862,801 B1
(45) Date of Patent: Dec. 8, 2020

(54) SELECTIVE MEDIA ACCESS CONTROL (MAC) LEARNING AND PURGING TO REDUCE FLOODING AND REPLICATION IN A NETWORK

(71) Applicant: Juniper Networks, Inc., Sunnyvale, CA (US)

(72) Inventor: Umang Akash, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/192,303

(22) Filed: Nov. 15, 2018

(51) Int. Cl.
| | |
|---|---|
| *H04L 12/741* | (2013.01) |
| *H04L 12/24* | (2006.01) |
| *H04L 29/12* | (2006.01) |
| *G06N 20/00* | (2019.01) |
| *H04L 12/26* | (2006.01) |
| *H04L 12/863* | (2013.01) |
| *H04L 12/46* | (2006.01) |

(52) U.S. Cl.
CPC .......... *H04L 45/745* (2013.01); *G06N 20/00* (2019.01); *H04L 12/4641* (2013.01); *H04L 41/0803* (2013.01); *H04L 43/16* (2013.01); *H04L 47/6215* (2013.01); *H04L 61/6022* (2013.01)

(58) Field of Classification Search
CPC ............... H04L 45/745; H04L 12/4641; H04L 41/0803; H04L 47/6215; H04L 43/16; H04L 61/6022; G06N 20/00
See application file for complete search history.

(56) References Cited

U.S. PATENT DOCUMENTS

| | | | | |
|---|---|---|---|---|
| 7,149,214 | B2 * | 12/2006 | Wu | H04L 45/04 370/389 |
| 9,819,515 | B1 * | 11/2017 | Seal | H04L 12/4641 |
| 2006/0165095 | A1 * | 7/2006 | Samprathi | H04L 43/0817 370/395.53 |
| 2007/0171908 | A1 * | 7/2007 | Tillman | H04L 12/66 370/389 |
| 2008/0068985 | A1 * | 3/2008 | Mieno | H04L 12/66 370/217 |
| 2014/0198793 | A1 * | 7/2014 | Allu | H04L 45/245 370/392 |

(Continued)

OTHER PUBLICATIONS

Cisco, Shashank Singh, "Troubleshooting Cisco Catalyst 6500/6800 Series Switches", Feb. 15-19, 2016, pp. 9, 10, 19. (Year: 2016).*

(Continued)

*Primary Examiner* — Andrew Lai
*Assistant Examiner* — Chuong M Nguyen
(74) *Attorney, Agent, or Firm* — Harrity & Harrity, LLP

(57) ABSTRACT

A network device may select a candidate entry to remove from a media access control (MAC) table maintained at the network device based on determining that the MAC table is exhausted. The candidate entry may include an identifier for a first virtual local area network (VLAN) associated with the candidate entry. The network device may receive a packet from a source node having a MAC address that does not appear in the MAC table, where the packet may include an identifier for a second VLAN in which the source node is a member. The network device may replace the candidate entry in the MAC table with a new entry corresponding to the source node based on determining that the second VLAN is associated with a greater number of ports than the first VLAN.

20 Claims, 12 Drawing Sheets

(56) References Cited

U.S. PATENT DOCUMENTS

| | | | | |
|---|---|---|---|---|
| 2014/0321470 | A1* | 10/2014 | Ookawa | H04L 49/3009 |
| | | | | 370/395.53 |
| 2014/0376556 | A1* | 12/2014 | Haggar | H04L 61/103 |
| | | | | 370/400 |
| 2016/0308789 | A1* | 10/2016 | Schmelzer | H04L 45/28 |
| 2018/0026872 | A1* | 1/2018 | Manthiramoorthy | ........................ |
| | | | | H04L 12/4641 |
| | | | | 370/249 |

OTHER PUBLICATIONS

Cisco, "Configuring the MAC Address Table," Cisco Nexus 3000 NX-OS Layer 2 Switching Configuration Guide, Release 5.0(3)U3(1), Nov. 20, 2017, 4 pages.

Juniper Networks, Inc., "Ethernet Switching Feature Guide," Nov. 8, 2018, 302 pages.

Sean Wilkins, "Basic Data Transmission in Networks: MAC Tables and ARP Tables," Pearson Education, Pearson IT Certification, May 12, 2015, 2 pages.

\* cited by examiner

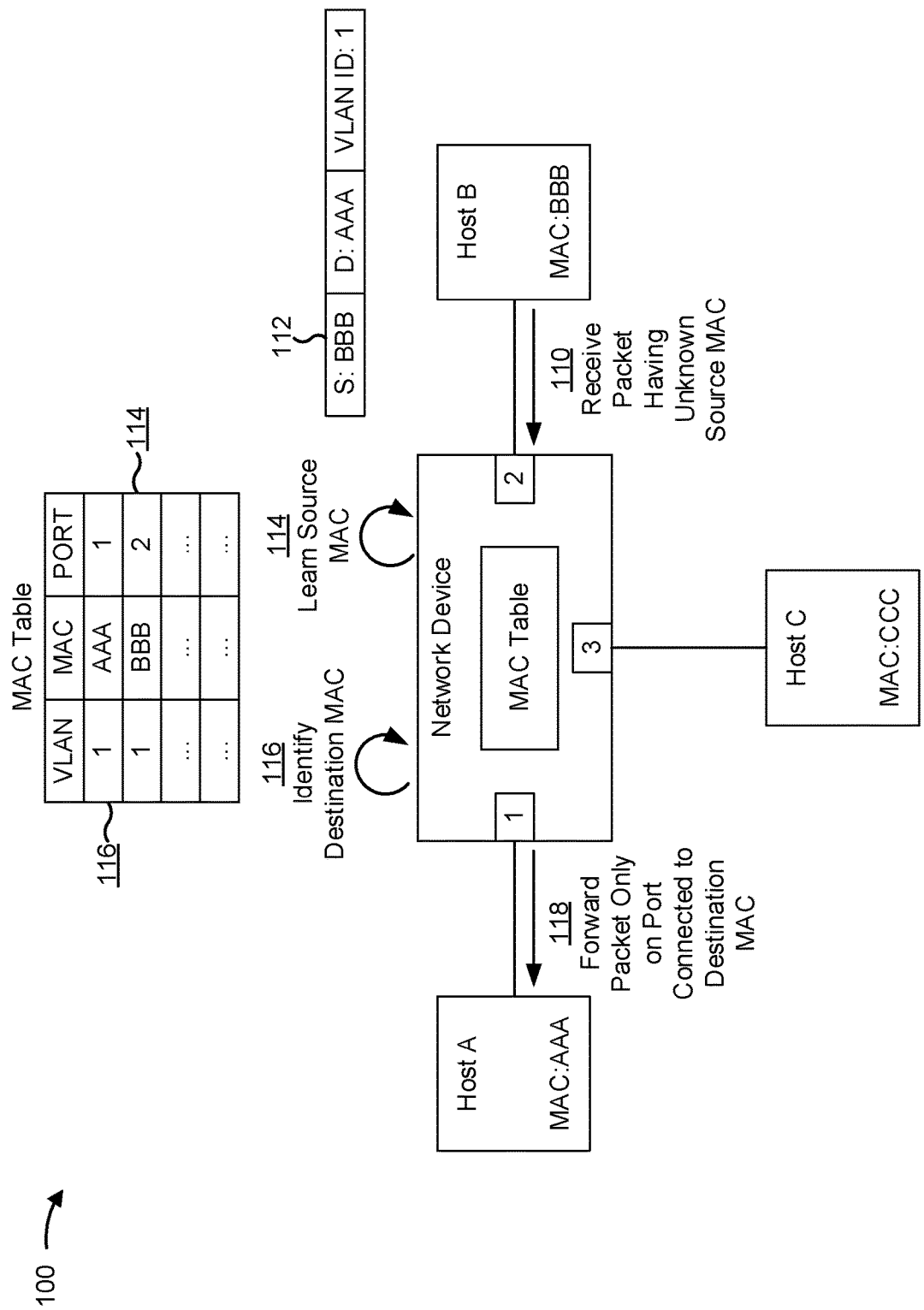

SELECTIVE MEDIA ACCESS CONTROL (MAC) LEARNING AND PURGING TO REDUCE FLOODING AND REPLICATION IN A NETWORK

BACKGROUND

A network switch on a network may maintain a media access control (MAC) table that maps physical ports of the network switch to MAC addresses of devices on the network. When a packet is received by the network switch that is destined for a device having a MAC address included in the MAC table, the packet may then be forwarded via the port on the network switch that is associated with the destination in the MAC table. For example, to facilitate forwarding, the network switch may perform MAC address "learning." MAC address learning refers to a process for reducing network traffic, where the source MAC address in a received packet may be recorded in the MAC table along with a port of origin. This allows future packets destined for the source MAC address to be forwarded on only the port on which that address is located.

SUMMARY

According to some implementations, a method may include determining a quantity of entries in a media access control (MAC) table maintained at a network device. The method may include configuring a ternary content-addressable memory (TCAM) entry based on the quantity of entries in the MAC table satisfying a threshold value, wherein the TCAM entry includes an identifier for a first virtual local area network (VLAN) associated with a candidate entry for removal from the MAC table. The method may include receiving a packet from a source node having a MAC address that does not appear in the MAC table, wherein the packet includes an identifier for a second VLAN in which the source node is a member. The method may include selectively learning the MAC address of the source node based on whether the second VLAN is associated with a greater number of ports than the first VLAN associated with the candidate entry for removal from the MAC table, wherein learning the MAC address of the source node comprises removing the candidate entry from the MAC table and inserting a new entry corresponding to the source node into the MAC table.

According to some implementations, a network device may include one or more memories, and one or more processors to select a candidate entry to remove from a MAC table maintained at the network device based on a quantity of entries in the MAC table satisfying a threshold value, wherein the candidate entry includes an identifier for a first VLAN associated with the candidate entry. The one or more processors may receive a packet from a source node having a MAC address that does not appear in the MAC table, wherein the packet includes an identifier for a second VLAN in which the source node is a member. The one or more processors may replace the candidate entry in the MAC table with a new entry corresponding to the source node based on determining that the second VLAN is associated with a greater number of ports than the first VLAN.

According to some implementations, a non-transitory computer-readable medium may store instructions that include one or more instructions that, when executed by one or more processors of a network device, cause the one or more processors to determine a plurality of candidate entries to remove from a MAC table maintained at the network device based on determining that a capacity of the MAC table is exhausted, wherein each of the plurality of candidate entries is associated with a quantity of ports that is fewest among the entries in the MAC table. The one or more instructions may cause the one or more processors to receive a first packet from a first source node having a MAC address that does not appear in the MAC table, and to forward the first packet without learning the MAC address of the first source node based on determining that the first source node is associated with a fewer number of ports than the plurality of candidate entries. The one or more instructions may cause the one or more processors to receive a second packet from a second source node having a MAC address that does not appear in the MAC table, and to purge one of the plurality of candidate entries from the MAC table and add a new entry corresponding to the second source node to the MAC table based on determining that the second source node is associated with a greater number of ports than the plurality of candidate entries.

BRIEF DESCRIPTION OF THE DRAWINGS

FIGS. 1A-1F are diagrams of an example implementation described herein.

DETAILED DESCRIPTION

Figure 1A:
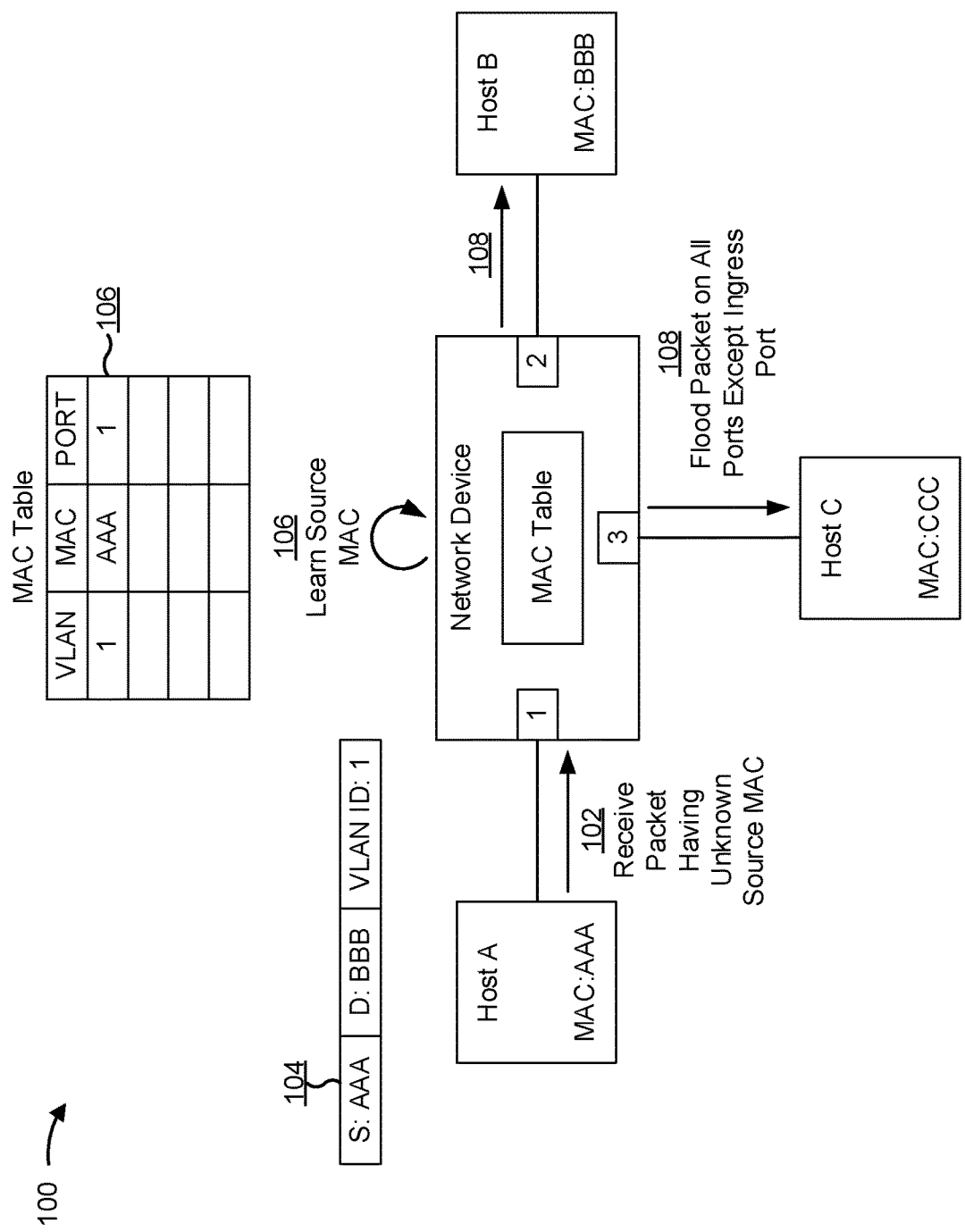

The following detailed description of example implementations refers to the accompanying drawings. The same reference numbers in different drawings can identify the same or similar elements.

A network switch is a network device that connects hosts and/or other suitable devices to one another on a computer network using packet switching to receive, process, and forward data to a destination host. Typically, a network switch has multiple ports and uses hardware addresses (e.g., media access control (MAC) addresses) to process and forward data to destination hosts. For example, a network switch may maintain a MAC table (sometimes called a MAC address table, forwarding table, switching table, and/or or the like) that maps individual MAC addresses on a network to a physical port on the network switch. For example, when the network switch receives a packet having a source MAC address that is unknown (i.e., the source MAC address does not appear in the MAC table), the source MAC address may be added to the MAC table along with an identifier of an ingress port on which the packet was received. Accordingly, when the network switch receives a subsequent packet having a destination MAC address that matches a MAC address stored in the MAC table, the packet may be forwarded on only the port that is associated with the matching MAC address. In this way, the packet can be bridged exclusively to the network segment where the intended recipient is located, which may reduce network traffic relative to other devices (e.g., network hubs) that indiscriminately flood packets out of every port except an ingress port (i.e., a port on which the packet was received).

In general, a MAC table is implemented as a system memory construct as a form of content-addressable memory (e.g., a hardware-based table). This allows the network switch to facilitate communications between connected hosts at a high-speed regardless of how many hosts are connected to the network switch. However, this also means that the MAC table typically has a finite capacity, meaning that the MAC table can potentially become exhausted to the point that the network switch cannot learn any new MAC addresses. For example, in one scenario, the MAC table can become exhausted in highly dense datacenter environments where the network switch is connected to many hosts and/or other switches that are connected to many hosts, including servers that may be running many virtual machines that each has a respective virtual network interface (VNIC) associated with a different MAC address. In another scenario, the MAC table can become exhausted due to a MAC flooding attack, where many packets that each contains a different MAC address are fed to a network switch with the intention to consume the finite memory that is set aside in the network switch to store the MAC table.

Regardless of the circumstances that cause the MAC table exhaustion, the effect is that the network switch cannot learn new MAC addresses, resulting in significant replication and flooding behavior because the network switch does not know which port is connected to the intended recipient of a packet. In particular, if the network switch receives a packet having a source MAC address that does not appear in the MAC table, the source MAC address will not be learned if the MAC table is exhausted (i.e., lacks sufficient capacity to store a new entry). Consequently, if the network switch subsequently receives a packet with a destination MAC address corresponding to the MAC address that was not learned, the destination MAC address will be treated as unknown even though the network switch previously processed a packet originating from that MAC address. The network switch will therefore flood the packet on all its ports that are associated with a same virtual local area network (VLAN) as the packet except the ingress port on which the packet was received.

Some implementations described herein relate to techniques for selective MAC learning and/or purging to reduce flooding and replication in a network. More particularly, to avoid the above-mentioned problems that may arise when blindly flooding and/or replicating a packet on all ports of a network switch when a MAC table maintained at the network switch is exhausted and/or a quantity of entries in the MAC table otherwise satisfies a threshold value, one or more existing entries may be purged from the MAC table to make space to learn one or more new MAC addresses. For example, in some implementations, the quantity of entries in the MAC table may satisfy the threshold value when the MAC table is full and cannot accommodate an additional entry, when a quantity of used entries is greater than or equal to a maximum value, when a quantity of empty entries is less than or equal to a minimum value, and/or the like. In some implementations, the one or more existing entries may be purged based on one or more criteria that are configured to reduce flooding and/or replication in the network. For example, an existing entry may be purged in favor of a new entry only if learning the new entry would lead to less flooding and/or replication relative to not learning the new entry (e.g., where the existing entry corresponds to a node that is a member of a first virtual local area network (VLAN) associated with fewer ports than a second VLAN associated with the new entry). Furthermore, in some implementations, the existing entry to be removed may be selected to minimize flooding and/or replication relative to other entries in the MAC table (e.g., existing entries may be sorted in a priority queue, where entries with the fewest ports may be purged first because removing such entries may cause the least flooding and/or replication).

In this way, the selective MAC learning and purging may reduce unnecessary network traffic by forwarding packets on only the port that is connected to an intended destination host. Furthermore, in this way, performance can be improved at hosts that are not the intended destination host because such hosts do not have to waste network, processor, memory, and/or other resources processing packets that will ultimately be dropped because the packets are intended for a different device. Further still, the selective MAC learning and purging may reduce susceptibility to certain network attacks, such as MAC flooding attacks that can lead to denial-of-service, flooding behavior that may potentially expose sensitive data on network segments where the sensitive data would not normally be communicated, and/or other security vulnerabilities. Even further still, in this way, a network can be administered in a way that best suits organizational needs because hosts (including hosts with multiple VNICs) can be added to the network without concern that adding such hosts will lead to substantial flooding and/or replication.

FIGS. 1A-1F are diagrams of an example implementation 100 described herein. For example, in implementation 100, a network device (e.g., a network switch) may be configured to store, in a system memory, a MAC table having a finite capacity. The network device may generally use the MAC table to map MAC addresses associated with one or more nodes (e.g., host devices, which may be endpoint devices, servers that are connected to one or multiple endpoint devices, and/or the like) to respective ports that the one or more nodes are connected to on the network device. Furthermore, in some implementations, each entry in the MAC table stored at the network device may include an identifier of a virtual local area network (VLAN) in which the corresponding node is a member.

In this way, when the network device receives a first packet from a given node on a particular port, the network device may forward subsequent packets that are destined for that node only on the particular port on which the first packet was received. This may reduce congestion in the network because the subsequent packets are not replicated on other ports that are not connected to the destination node. Furthermore, performance may be improved at other nodes because the other nodes are not burdened with processing packets that are intended for a different node. Furthermore, by associating each entry in the MAC table with the identifier of the VLAN in which the corresponding node is a member, the network device can make informed decisions about which entry or entries to purge from the MAC table when a quantity of entries in the MAC table satisfies a threshold (e.g., when the MAC table is full, the quantity of entries is greater than or equal to a maximum value, a quantity of empty entries is less than or equal to a minimum value, and/or the like). For example, in some implementations, the network device may selectively purge one or more entries that are likely to cause the least flooding and/or replication in the network based on the one or more purged entries corresponding to nodes that are members of a VLAN associated with a fewest number of ports relative to other VLANs in the network.

As shown in FIG. 1A, and by reference number 102, the network device may receive a packet from a first host (Host A) on a first port. As shown in FIG. 1A, and by reference number 104, the packet received from Host A may include a source MAC address (shown as AAA), a destination MAC address (shown as BBB), and an identifier of a VLAN associated with Host A (shown as 1). When the packet is received, the network device may compare the source MAC address to MAC addresses stored in the MAC table and learn the source MAC address if the MAC table does not have an entry with a matching MAC address. For example, as shown in FIG. 1A, and by reference number 106, the network device may learn the MAC address of Host A by adding the source MAC address contained in the received packet to the MAC table along with an identifier of an ingress port on which the packet was received and the identifier of the VLAN associated with Host A. In this way, the network device may learn the MAC address of Host A so that the network device can forward subsequent packets identifying that MAC address as a destination only on the port connected to Host A. Furthermore, by associating the learned MAC address with the identifier of the VLAN associated with Host A, the network device may bind the MAC address to the corresponding VLAN so that Host A may persistently belong to the same VLAN even though Host A may subsequently connect to the network device on a different port (e.g., due to mobility and/or other reasons).

Furthermore, as shown in FIG. 1A, and by reference number 108, the network device may flood the packet on each port except the ingress port on which the packet was received because the MAC table does not have an entry that corresponds to the destination MAC address. As such, the packet may be received at a second host (Host B) which is the intended recipient and at a third host (Host C) that is not the intended recipient. Consequently, until the network device receives a packet from a node, the network device may generally replicate and flood packets that are destined for the node on each port except the ingress port because the network device does not yet know where the node is located within the network.

As shown in FIG. 1B, and by reference number 110, the network device may subsequently receive a packet from Host B on a second port. As shown in FIG. 1B, and by reference number 112, the packet received from Host B may include a source MAC address (shown as BBB), a destination MAC address (shown as AAA), and an identifier of a VLAN associated with Host B (shown as 1). In the illustrated example, the destination MAC address corresponds to Host A whose MAC address was previously learned. As shown in FIG. 1B, and by reference number 114, the network device may learn the MAC address associated with Host B based on the MAC table not having an entry corresponding to the source MAC address. For example, as shown in FIG. 1B, and by reference number 114, the network device may learn the MAC address associated with Host B by adding the source MAC address contained in the packet received from the second host to the MAC table along with an identifier of an ingress port on which the packet was received and the identifier of the VLAN associated with the second host. In this way, the network device may learn the MAC address of Host B so that subsequent packets destined for Host B can be forwarded only on the port connected to Host B.

As shown in FIG. 1B, and by reference number 116, the network device may identify an entry in the MAC table that corresponds to the destination MAC address contained in the packet received from Host B. In this example, because the destination MAC address corresponds to Host A and a packet was previously received from Host A, the MAC table contains an entry corresponding to the destination MAC address. As shown in FIG. 1B, and by reference number 118, the network device may forward the packet only on the port connected to Host A that is associated with the destination MAC address contained in the packet. In this way, network congestion may be reduced because the network device does not replicate and flood the packet on other ports that are not connected to the applicable destination MAC address. Furthermore, in this way, information security may be improved relative to other devices (e.g., network hubs) that flood packets on every port except the ingress port because data is not exposed in network segments where the data should not be accessible. Further still, using the MAC table to forward packets only on the port that is connected to the intended recipient may improve performance at devices that are connected to other ports because such devices can avoid expending network, processor, memory, and/or other resources handling (and ultimately dropping) packets that are intended for other devices.

In some implementations, the foregoing description generally details how the network device may perform MAC learning while the MAC table has sufficient space to store new entries. However, as noted above, the MAC table is generally implemented in hardware as a form of content-addressable memory, meaning that the MAC table may have a finite capacity. Accordingly, in some implementations, the network device may implement selective MAC learning and purging using a combination of hardware support and software support to address problems that may arise when the MAC table becomes exhausted.

Figure 1C:
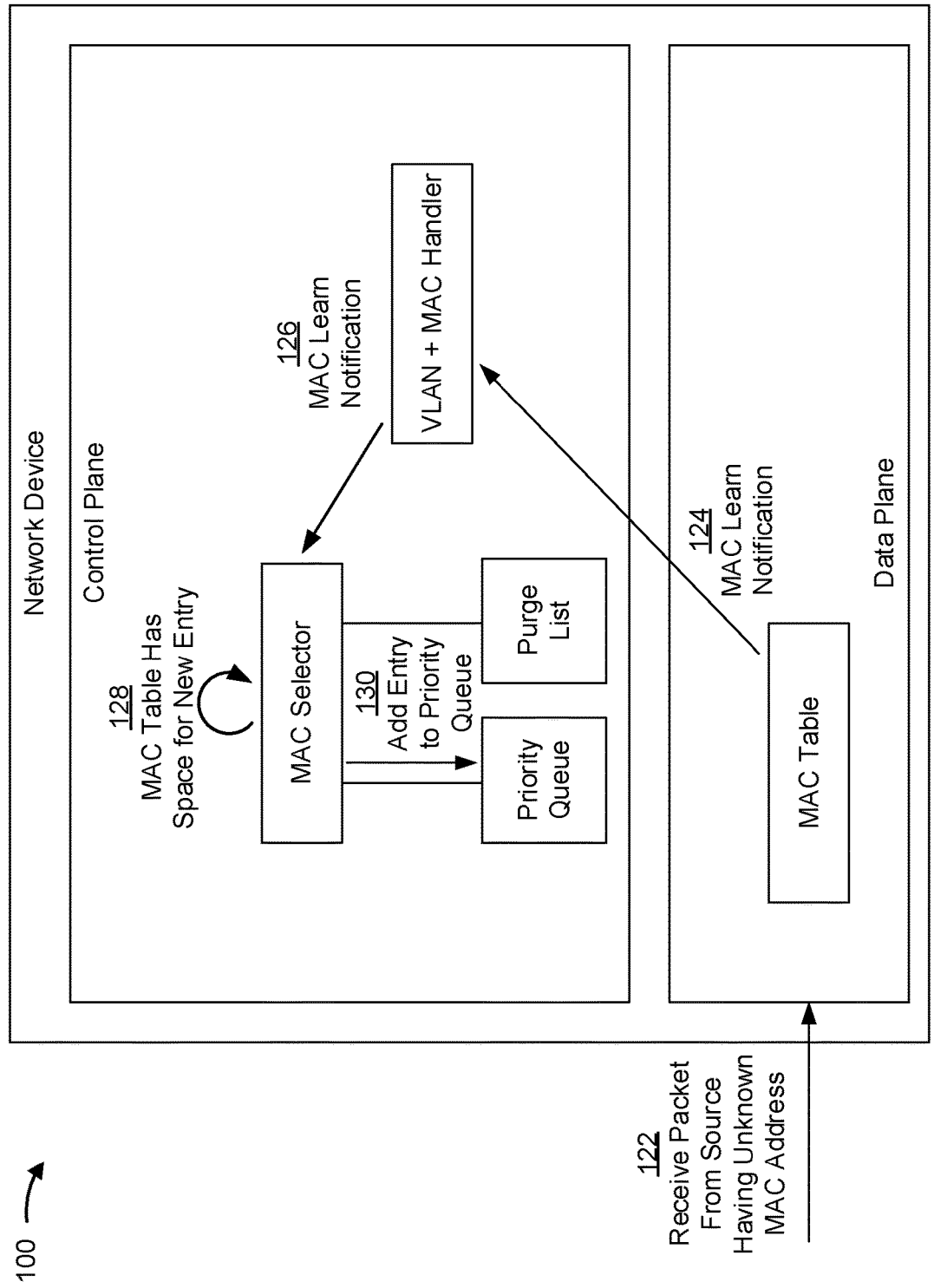

As shown in FIG. 1C, the network device may include a data plane implemented in hardware and a control plane implemented in software. In some implementations, the data plane and the control plane may act in coordination to perform selective MAC learning and purging in a manner that may reduce flooding and/or replication in a network. For example, as will be described in further detail below, the control plane may include a VLAN+MAC handler configured to enforce the selective MAC learning and purging at a software-level and a MAC selector configured to maintain one or more data structures (e.g., a priority queue and a purge list) that can be used to manage the MAC table stored in the data plane at a hardware-level.

As shown in FIG. 1C, and by reference number 122, the network device (e.g., a campus switch, a datacenter switch, etc.) may receive a packet from a source having an unknown MAC address (i.e., a source MAC address contained in the packet does not appear in the MAC table). Accordingly, as shown in FIG. 1C, and by reference number 124, the data plane may generate a MAC learn notification to indicate that there is a pending entry to be added to the MAC table and send the MAC learn notification to the control plane. In some implementations, the VLAN+MAC handler may determine whether the pending entry should be added to the MAC table based on one or more software-level configurations. For example, in some implementations, the one or more software-level configurations may disable MAC learning on one or more interfaces and/or VLANs (e.g., MAC learning may be disabled on a VLAN associated with two ports to manage available space in the MAC table because an incoming packet received on a first port associated with the VLAN would be forwarded on only the second port associated with the VLAN regardless of whether the destination MAC address is known or unknown, so enabling MAC learning on such VLANs would consume available space in the MAC table without offering any reduction in replication and/or flooding behavior).

As shown in FIG. 1C, and by reference number 126, the VLAN+MAC handler may forward the MAC learn notification to the MAC selector based on determining that the pending entry is to be added to the MAC table. As shown by reference number 128, the MAC selector may determine that the MAC table has available space to store the pending entry based on a comparison of a quantity of entries in the MAC table and a threshold value. For example, in some implementations, the MAC selector may determine that the MAC table has available space to store the pending entry based on determining that the quantity of entries in the MAC table is less than or equal to a high threshold, that a quantity of available entries is greater than or equal to a low threshold, and/or the like.

As shown in FIG. 1C, and by reference number 130, the MAC selector may insert the pending entry into the priority queue based on determining that the MAC table has available space to store the pending entry. In some implementations, the priority queue can be used to provide the control plane with complete knowledge about the MAC table maintained at the data plane. In particular, like each entry in the MAC table, each entry in the priority queue may contain a MAC address of a node that was learned at the hardware-level, an identifier of a VLAN associated with the node, and an identifier of a port connecting the node to the network device (i.e., an ingress port on which a packet was received from the node).

Furthermore, in some implementations, each entry in the MAC table and each corresponding entry in the priority queue may be associated with an aging timer, which may correspond to a maximum time that an entry can remain in the MAC table before aging out. In this way, the aging timer can ensure that the entries in the MAC table and the corresponding entries in the priority queue are tracking only MAC addresses that are active on the network such that older MAC addresses that are not in active use can be flushed out to make space for new entries. In some implementations, the maximum time that an entry can remain in the MAC table before aging out may be defined to reduce the amount of traffic that is flooded on multiple ports when traffic is received for MAC addresses that are no longer in the MAC table. For example, the maximum time may be increased with respect to one or more VLANs containing servers that primarily receive packets and rarely transmit packets (e.g., syslog servers) to reduce flooding across the one or more VLANs. In another example, the maximum time may be decreased with respect to one or more VLANs containing devices that frequently transmit packets.

In some implementations, when the pending entry is inserted into the priority queue, the MAC selector may associate the pending entry with a priority value and insert the pending entry into the priority queue according to the priority value. In this way, the entries in the priority queue may be ordered according to their respective priority values and an entry at a front (or head) of the priority queue may be a first candidate for removal from the MAC table if and/or when a quantity of entries in the MAC table satisfies a threshold value used to indicate that the MAC table is exhausted. In some implementations, the MAC selector may set the priority value of each entry in the priority queue based on a quantity of ports that are associated with the VLAN corresponding to the entry. For example, in some implementations, the priority value may be determined such that entries associated with a first VLAN associated with a fewest number of ports have a highest priority, entries associated with a second VLAN associated with a second fewest number of ports have a second highest priority, and so on. Accordingly, an entry at the front of the priority queue may correspond to a node that belongs to a VLAN associated with a fewest number of ports on the network device.

In some implementations, when there is a tie at the point of insertion (e.g., where two or more entries are associated with the same VLAN or different VLANs that are associated with the same quantity of ports), the tie may be broken based on the aging timer. For example, when a first entry is associated with an aging timer that has a higher value than an aging timer associated with a second entry, the first entry may be considered older than the second entry and thus given a higher priority than the second entry. In this way, entries that are closer to aging out of the MAC table may be more likely candidates for removal from the MAC table, which may reduce internal traffic at the network device. For example, in normal operating conditions, one or more entries may be deleted from the MAC table at the hardware-level due to the aging timer expiring, a topology change deleting one or more VLANs, and/or other suitable events. In these cases, the corresponding entries may also be deleted from the priority queue. Accordingly, using the aging timer to break ties among multiple entries that have an equal priority may reduce internal traffic because there may be no need to purge older entries that age out normally.

Figure 1D:
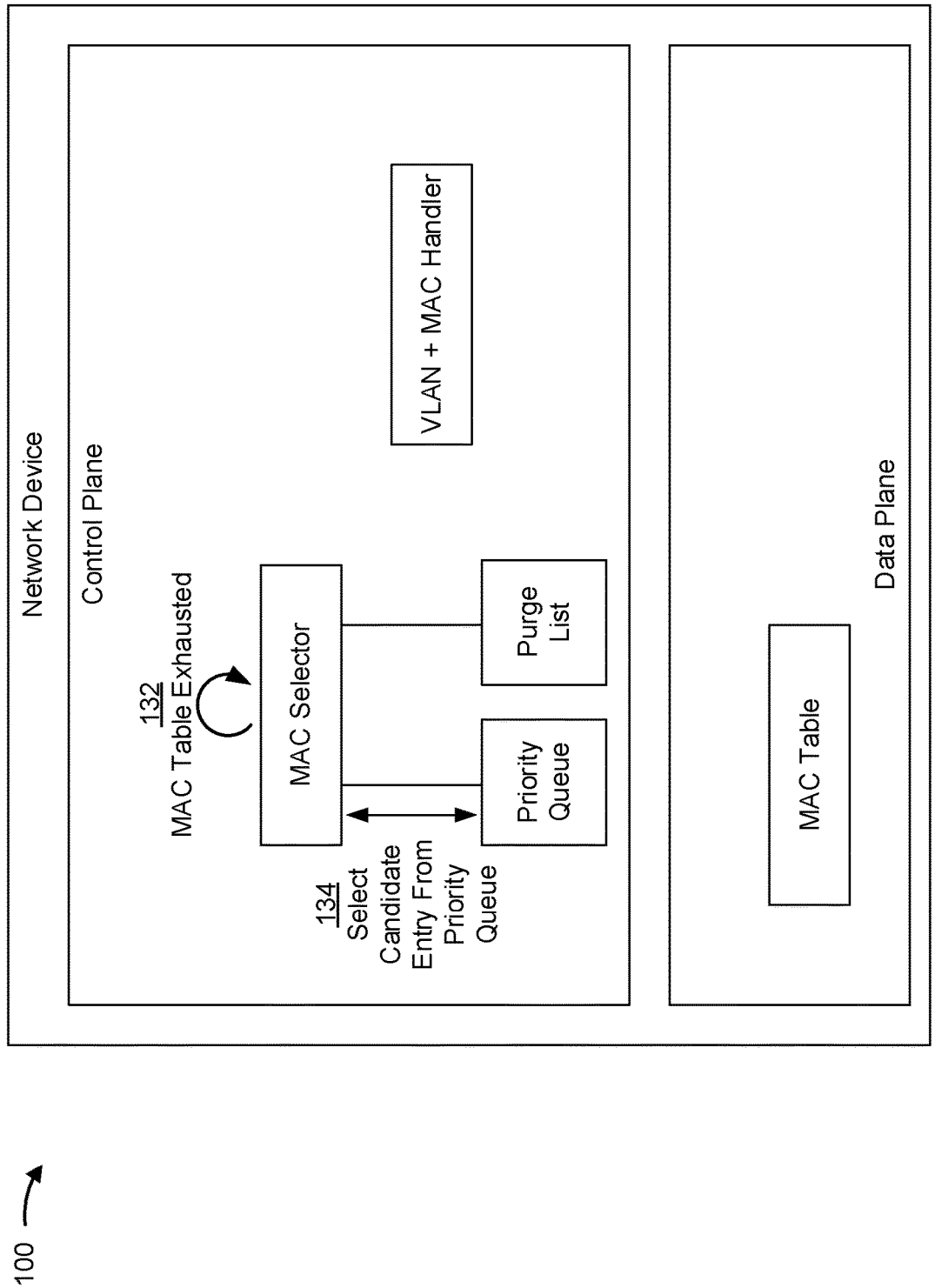

As shown in FIG. 1D, and by reference number 132, at some point in time, the MAC selector may determine that the MAC table is exhausted based on a quantity of entries in the priority queue (which corresponds to a quantity of entries in the MAC table) satisfying a threshold value. For example, in some implementations, the MAC table may be determined to be exhausted based on the quantity of entries in the priority queue equaling a maximum number of entries that can be stored in the MAC table (e.g., indicating that the MAC table is completely full and cannot accommodate another entry), based on determining that the quantity of entries in the priority queue and thus the MAC table is greater than or equal to a maximum number, based on determining that the MAC table has capacity to store a quantity of additional entries that is less than or equal to a minimum number, and/or the like.

As shown in FIG. 1D, and by reference number 134, the MAC selector may select a candidate entry from the priority queue based on determining that the MAC table is exhausted. For example, in some implementations, the candidate entry can be an entry at the front of the priority queue (e.g., an entry to be removed from the MAC table first). As noted above, each entry in the priority queue may include a MAC address and an identifier of a VLAN, among other information. In some implementations, the candidate entry can thus be used to configure a dummy entry to be installed in a ternary content-addressable memory (TCAM) at the data plane for comparison to subsequent incoming packets that are received from source nodes having unknown MAC addresses. The TCAM may be implemented in hardware at the data plane separate from a content-addressable memory (CAM) that contains the MAC table. In this way, the dummy entry (referred to herein as "TCAM entry") can be installed in the data plane to enable selective MAC learning and purging when the control plane determines that the MAC table is exhausted, which may occur when the quantity of entries in the MAC table satisfies a threshold value. Furthermore, in some implementations, the TCAM entry may subsequently be removed from the data plane when the MAC table has a threshold quantity of empty entries. In this way, removing the TCAM entry may avoid frequent addition and deletion of the TCAM entry and resultant overhead due to short-term fluctuations in the utilization of the MAC table.

Figure 1E:
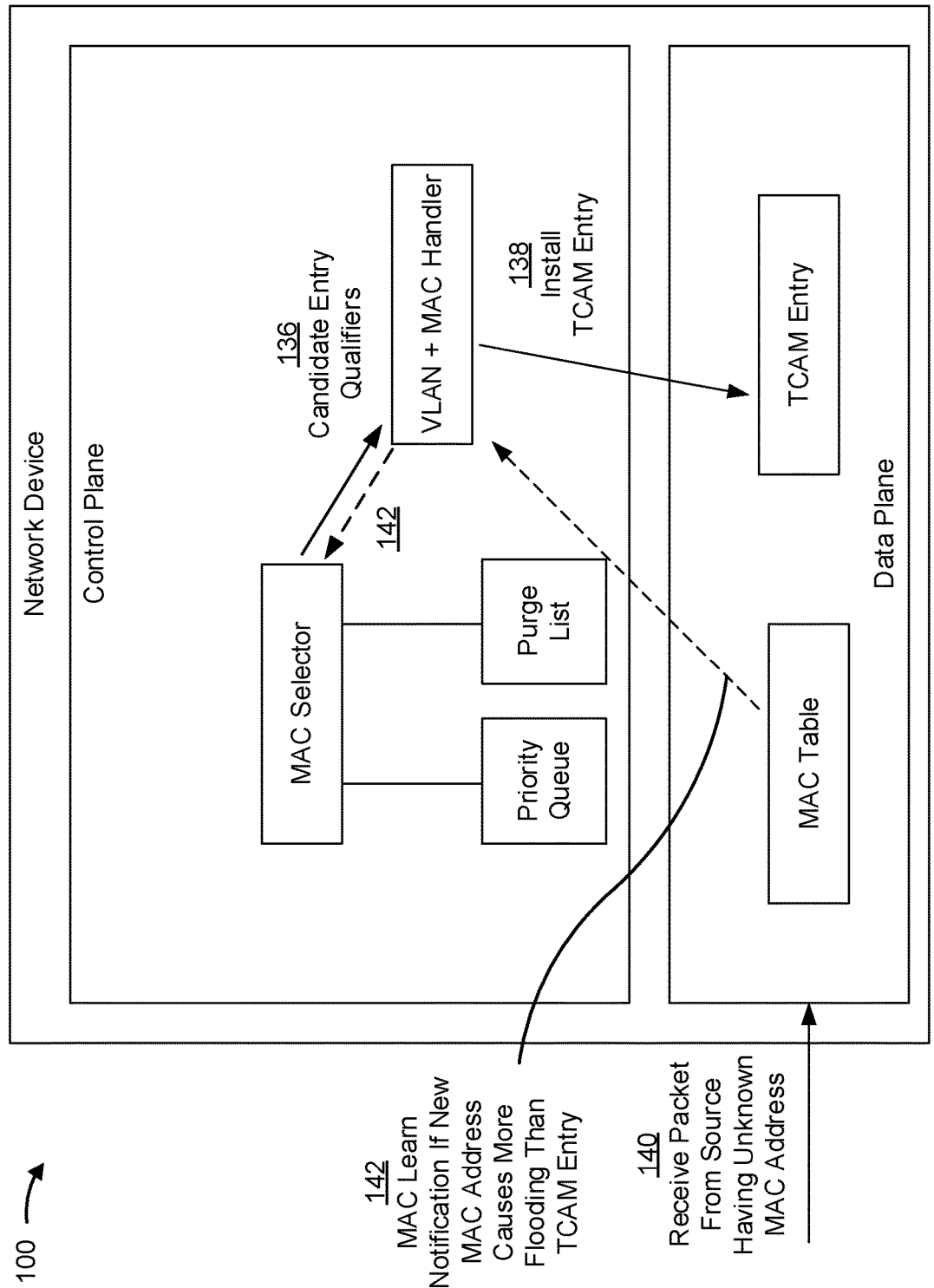

As shown in FIG. 1E, and by reference number 136, the MAC selector may provide one or more qualifiers associated with the candidate entry selected from the front of the priority queue to the VLAN+MAC handler. For example, in some implementations, the one or more qualifiers may include the MAC address and the VLAN identifier associated with the candidate entry as well as a quantity of ports associated with the VLAN identifier. In this way, the quantity of ports associated with the VLAN identifier may provide a reference value related to an amount of replication and/or flooding that would occur if the candidate entry was to be purged from the MAC table and a subsequent packet is received with a destination MAC address corresponding to the candidate entry.

As shown in FIG. 1E, and by reference number 138, the VLAN+MAC handler in the software-based control plane may install a TCAM entry in the hardware-based data plane. The TCAM entry may include the one or more qualifiers associated with the candidate entry selected from the front of the priority queue. In particular, as noted above, the one or more qualifiers may include the MAC address and the VLAN identifier associated with the candidate entry as well as a quantity of ports associated with the VLAN identifier. Additionally, or alternatively, the quantity of ports associated with the VLAN identifier may be represented as a bitmap that enables the hardware-based data plane to determine the quantity of ports that are associated with the VLAN identifier based on how many bits are set (or not set) in the bitmap.

In some implementations, the TCAM entry may be referenced at the data plane to limit sending MAC learn notifications from hardware to software to instances in which replacing the candidate entry in the MAC table with a previously unknown source MAC address would cause less replication and/or flooding than maintaining the candidate entry and not learning the unknown source MAC address. In this way, the TCAM entry can be used to avoid sending to software MAC learn notifications that would not result in any measurable reduction in replication and/or flooding, which may reduce network congestion, increase available network bandwidth, reduce internal traffic, and/or offer other performance benefits, as described above.

Furthermore, in some implementations, the control plane may be running one or more other services that are configured to receive or otherwise handle hardware notifications. In this way, sending MAC learn notifications only when the MAC learn notifications offer a reduction in flooding and/or replication may reduce internal traffic and consequently improve performance for other software services that depend on hardware notifications. As such, once the MAC table is determined to be exhausted based on the quantity of entries in the MAC table satisfying the threshold value, it may be undesirable to send MAC learn notifications to software for all possible source MAC addresses that could be learned because that may create problems (e.g., denial of service) for the other services running in software. Instead, MAC learn notifications may be sent from hardware to software for only those packets that contain source MAC addresses that are candidates for replacement (e.g., can cause more replication and/or flooding than the TCAM entry). In this way, once the MAC table is determined to be exhausted based on the quantity of entries in the MAC table satisfying the threshold value, the network device may selectively learn MAC addresses only when the unknown MAC address(es) to be learned offer a performance benefit (e.g., less replication and/or flooding) than not learning the unknown MAC address(es).

For example, as shown in FIG. 1E, and by reference number 140, the data plane may receive a packet containing an unknown source MAC address at some point in time after the TCAM entry has been configured and installed at the data plane. In some implementations, based on the data plane determining that the MAC table does not contain an entry with the same source MAC address and VLAN identifier as the received packet, a quantity of ports associated with the VLAN identifier contained in the received packet may be compared with the quantity of ports associated with the VLAN identifier for the TCAM entry.

As shown in FIG. 1E, and by reference number 142, the data plane may send a MAC learn notification to the control plane for the received packet if not learning the source MAC address contained in the received packet would cause more flooding and/or replication than the TCAM entry. Otherwise, if learning the source MAC address contained in the received packet would cause less and/or the same amount of flooding and/or replication as the TCAM entry, the data plane may not send a MAC learn notification to the control plane. As shown in FIG. 1E, the MAC learn notification may be received at the VLAN+MAC handler, which may forward the MAC learn notification to the MAC selector. In some implementations, the MAC selector may check whether the purge list contains an entry that corresponds to the same combination of source MAC address and VLAN identifier contained in the MAC learn notification. In this way, the MAC selector may determine whether the potential new entry to be learned was recently deleted, as a recently deleted entry may not be learned to avoid repeatedly (re) learning and (re)deleting the same entry.

For example, whenever an entry is deleted from the priority queue (and the MAC table) to create space for another entry, the MAC selector may add the deleted entry to the purge list, as will be described in more detail below. In normal conditions, due to the aging timer expiring, topology changes (e.g., deleting one or more VLANs), and/or other suitable events, certain entries may be deleted from the hardware-based MAC table. In those cases, the corresponding entries may also be deleted from the priority queue. However, such entries may not be added to the purge list because the corresponding entries in the MAC table have already been deleted. As such, the MAC selector may add deleted entries to the purge list only when the entries are deleted from the priority queue to make space in the MAC table available for new entries that can cause more replication and/or flooding than the entries being deleted (i.e., where learning the new entries would cause less replication and/or flooding than maintaining the candidate entry on which the TCAM entry is based).

Figure 1F:
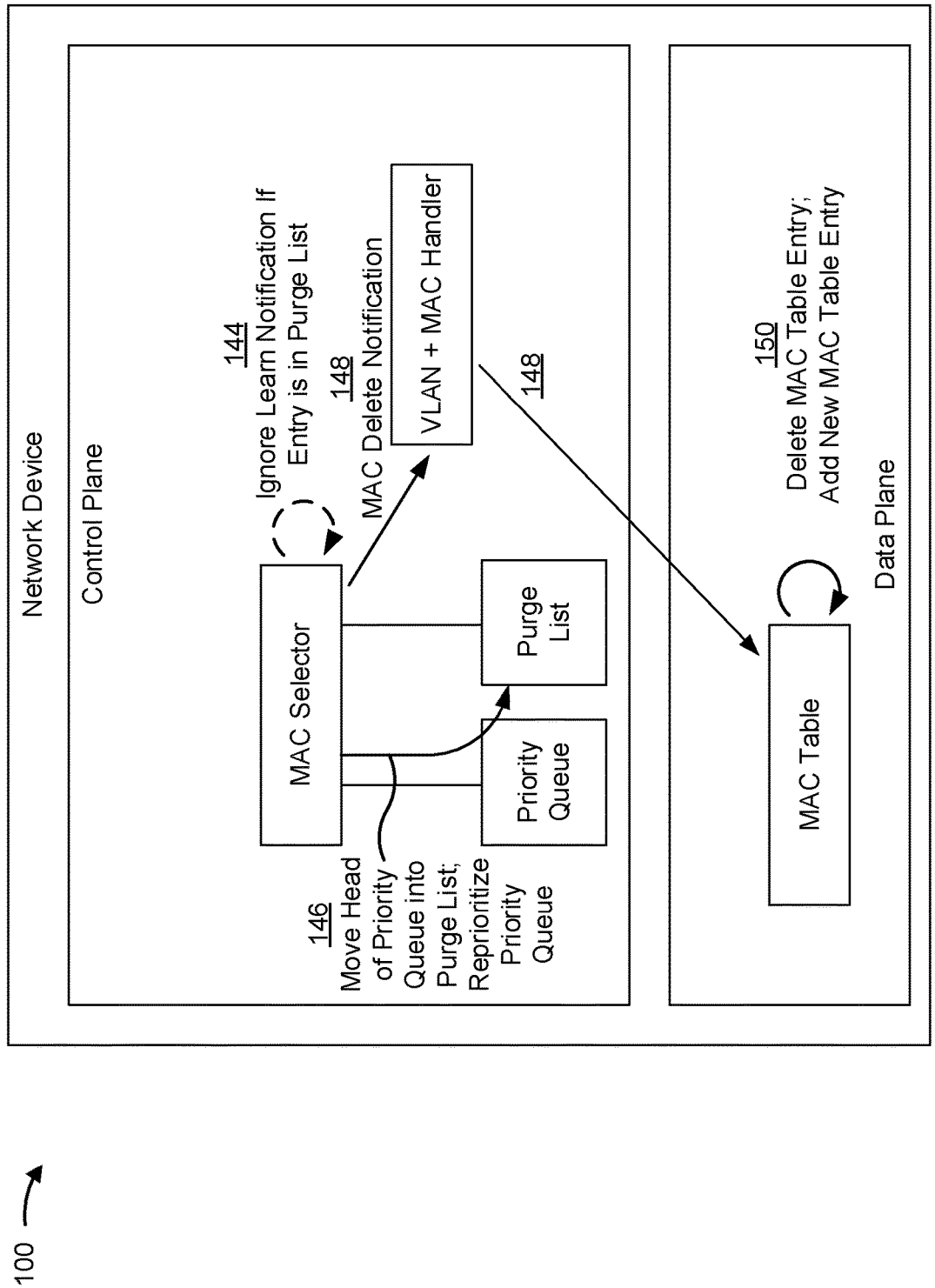

As shown in FIG. 1F, and by reference number 144, the MAC selector may optionally ignore the MAC learn notification based on determining that there is a corresponding entry with the same combination of source MAC address and VLAN identifier as the MAC learn notification. In this way, overhead, which may result from repeatedly adding and deleting the same entry to and from the MAC table, may be avoided. For example, in some implementations, each entry in the purge list may be associated with a timer, which may have a configurable duration that gives the best performance. As such, once the entry is inserted into the purge list, the timer may be started, and the entry may remain in the purge list until the timer expires.

Alternatively, as shown in FIG. 1F, and by reference number 146, the MAC selector may remove the entry at the front of the priority queue and move the entry into the purge list based on determining that a corresponding entry does not appear in the purge list. Furthermore, as noted above, the MAC selector may start the timer with respect to the entry moved into the purge list such that the entry will remain in the purge list until the timer expires. In some implementations, the MAC selector may also add the new entry to the priority queue in substantially the same manner as described above with respect to reference number 130. In some implementations, the MAC selector may further reprioritize the priority queue based on determining that one or more events have occurred. For example, the priority queue may be reprioritized based on adding the new entry, based on a topology change adding a new VLAN to and/or deleting a VLAN from the network, based on a change in an association between one or more ports and one or more VLANs, and/or the like.

As shown in FIG. 1F, and by reference number 148, a MAC delete notification may be sent from the control plane to the data plane. In some implementations, the MAC delete notification may instruct the data plane to remove from the MAC table an entry that corresponds to the entry moved into the purge list. Furthermore, the MAC delete notification may inform the data plane that the new entry can be added to the MAC table. Accordingly, as shown in FIG. 1F, and by reference number 150, the data plane may purge the entry corresponding to the MAC delete notification from the MAC table to make space for a new entry. As further shown by reference number 150, the new entry may be added to the MAC table such that any subsequent packets that identify a destination MAC address corresponding to the new entry and having the same VLAN identifier as the new entry can be forwarded on only the port that is connected to that destination MAC address.

As indicated above, FIGS. 1A-1F are provided merely as an example. Other examples may differ from what was described with regard to FIGS. 1A-1F.

Figure 2:
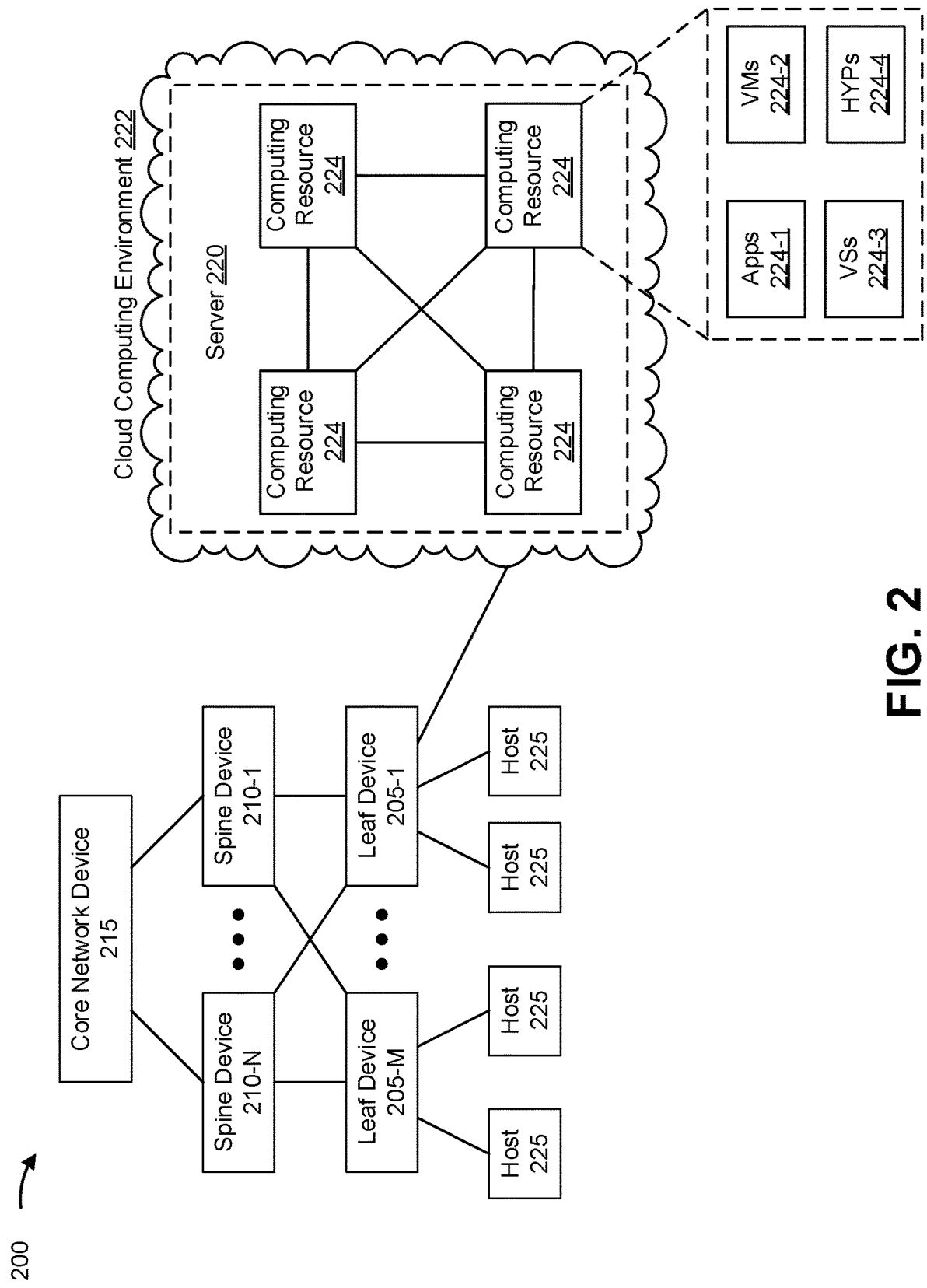
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a leaf device 205 (shown as leaf devices 205-1 through 205-M (M≥1)), a spine device 210 (shown as spine devices 210-1 through 205-N(N≥1)), a core network device 215, a server 220, a cloud computing environment 222, a computing resource 224, and a host 225. Devices of environment 200 may interconnect via wired connections, wireless connections, or a combination of wired and wireless connections.

Leaf device 205 includes one or more devices capable of receiving, storing, generating, processing, forwarding, and/or transferring information, such as packets. For example, leaf device 205 may include a switch, a router, a gateway, a bridge, a network interface controller (NIC), or a similar device. In some implementations, leaf device 205 may be a physical device implemented within a housing, such as a chassis. In some implementations, leaf device 205 may be a virtual device implemented by one or more computer devices of a cloud computing environment or a data center. Leaf device 205 may connect endpoint devices, such as hosts 225, server 220, and/or the like, to core network device 215 and/or other endpoint devices, such as via one or more spine devices 210. In some implementations, each leaf device 205 may be connected to each spine device 210. Leaf device 205 may perform selective MAC learning and purging to reduce flooding and replication in environment 200.

Spine device 210 includes one or more devices capable of receiving, storing, generating, processing, forwarding, and/or transferring information, such as packets. For example, spine device 210 may include a switch, a router, a gateway, a bridge, a MC, or a similar device. In some implementations, spine device 210 may be a physical device implemented within a housing, such as a chassis. In some implementations, spine device 210 may be a virtual device implemented by one or more computer devices of a cloud computing environment or a data center. Spine device 210 may connect routers, firewalls, switches, or other network devices. For example, spine device 210 may connect core network device 215 to endpoint devices, such as hosts 225, server 220, and/or the like, via one or more leaf devices 205. In some implementations, each spine device 210 may be connected to each leaf device 205. Spine device 210 may perform selective MAC learning and purging to reduce flooding and replication in environment 200.

Core network device 215 includes one or more devices capable of receiving, storing, generating, processing, forwarding, and/or transferring information, such as packets. For example, core network device 215 may include a switch, a router, a firewall, a gateway, a modem, a bridge, a NIC, a reverse proxy, a server (e.g., a proxy server), a multiplexer, a security device, an intrusion detection device, a load balancer, or a similar device. In some implementations, core network device 215 may be a physical device implemented within a housing, such as a chassis. In some implementations, core network device 215 may be a virtual device implemented by one or more computer devices of a cloud computing environment or a data center. In some implementations, core network device 215 may be a high-capacity device positioned in a physical core or backbone of a network. Core network device 215 may serve as a gateway to a network (e.g., a wide area network (WAN)) and may provide a final aggregation point for the network, allowing multiple aggregation modules (e.g., leaf device 205 and spine devices 210) to work together. Core network device 215 may perform selective MAC learning and purging to reduce flooding and replication in environment 200.

Server 220 includes one or more computing resources that may be assigned to one or more hosts 225. For example, server 220 may be a platform implemented by cloud computing environment 222 that may allow connections from one or more endpoint devices, such as hosts 225. In some implementations, server 220 is implemented by computing resources 224 of cloud computing environment 222.

Server 220 may include a server device or a group of server devices. In some implementations, server 220 may be hosted in cloud computing environment 222. Notably, while implementations described herein describe server 220 as being hosted in cloud computing environment 222, in some implementations, server 220 may be non-cloud-based or may be partially cloud-based.

Cloud computing environment 222 includes an environment that delivers computing as a service, whereby shared resources, services, etc. may be provided to endpoint devices, such as hosts 225. Cloud computing environment 222 may provide computation, software, data access, storage, and/or other services that do not require end-user knowledge of a physical location and configuration of a system and/or a device that delivers the services. As shown, cloud computing environment 222 may include server 220 and computing resource 224.

Computing resource 224 includes one or more personal computers, workstation computers, server devices, or another type of computation and/or communication device. In some implementations, computing resource 224 may host server 220. The cloud resources may include compute instances executing in computing resource 224, storage devices provided in computing resource 224, data transfer devices provided by computing resource 224, etc. In some implementations, computing resource 224 may communicate with other computing resources 222 via wired connections, wireless connections, or a combination of wired and wireless connections.

As further shown in FIG. 2, computing resource 224 may include a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 224-1 includes one or more software applications that may be provided to or accessed by host 225. Application 224-1 may eliminate a need to install and execute the software applications on host 225. For example, application 224-1 may include software associated with server 220 and/or any other software capable of being provided via cloud computing environment 222. In some implementations, one application 224-1 may send/receive information to/from one or more other applications 222-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., host 225), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 provides hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Host 225 includes one or more devices capable of receiving, generating, storing, processing, and/or providing information associated with services provided over a network. For example, host 225 may include a computing device, such as a server device, a desktop computer, a laptop computer, a tablet computer, a handheld computer, a mobile device, a storage device, or a similar type of device. In some implementations, host 225 may send packets to and/or receive packets from other hosts 225, where the packets are received and forwarded by one or more of leaf device(s) 205, spine device(s) 210, and/or core network device 215.

The number and arrangement of devices and networks shown in FIG. 2, including the leaf-spine topology illustrated therein, are provided as an example of how the various devices can be connected to one another. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200. Furthermore, in some implementations, the network device shown in FIGS. 1A-1F may correspond to leaf device 205, spine device 210, and/or core network device 215.

Figure 3A:
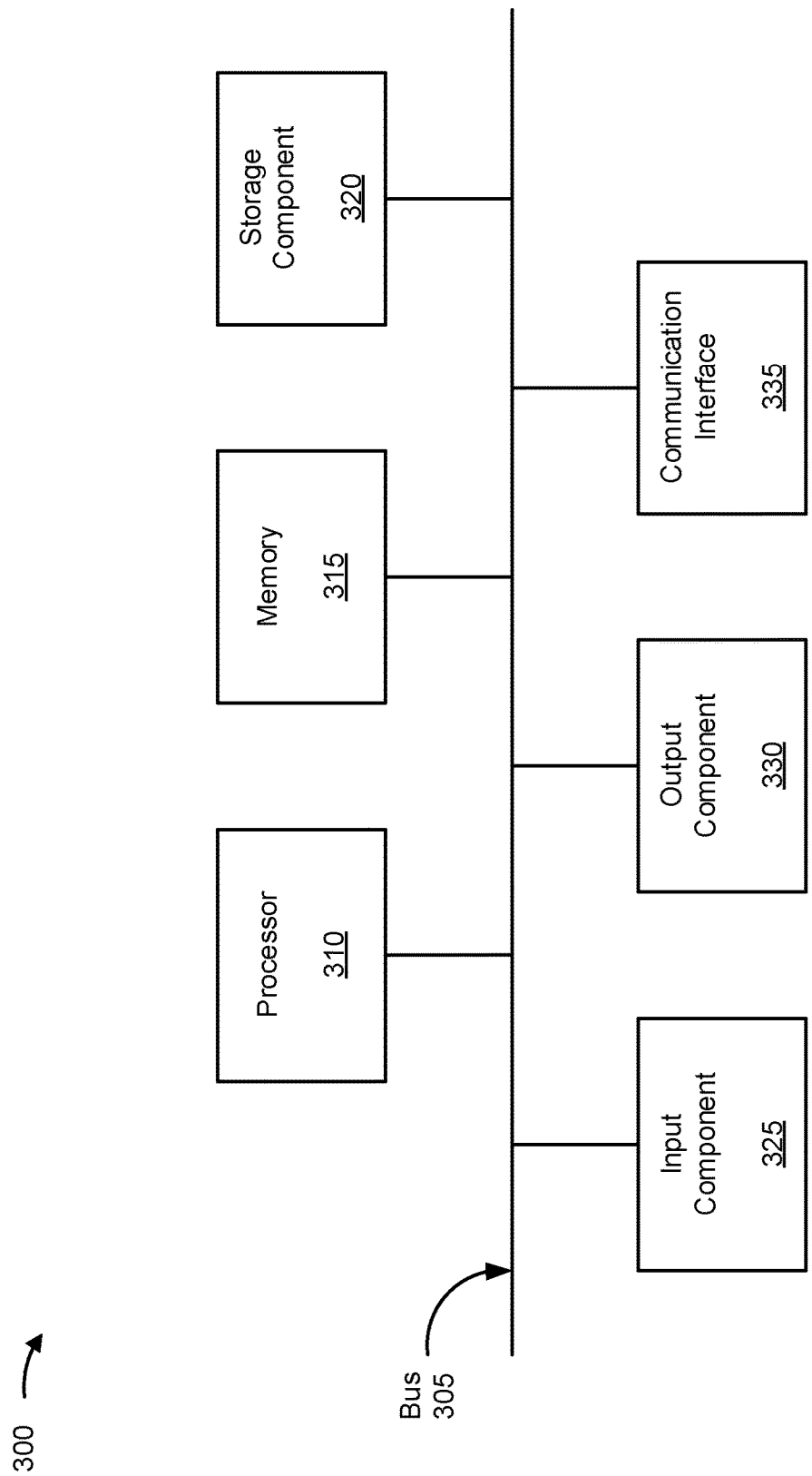
FIGS. 3A-3B are diagrams of example components of one or more devices of FIG. 2.

FIG. 3A is a diagram of example components of a device 300. Device 300 may correspond to leaf device 205, spine device 210, core network device 215, server 220, computing resource 224, and/or host 225. In some implementations, leaf device 205, spine device 210, core network device 215, server 220, computing resource 224, and/or host 225 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random-access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 3B:
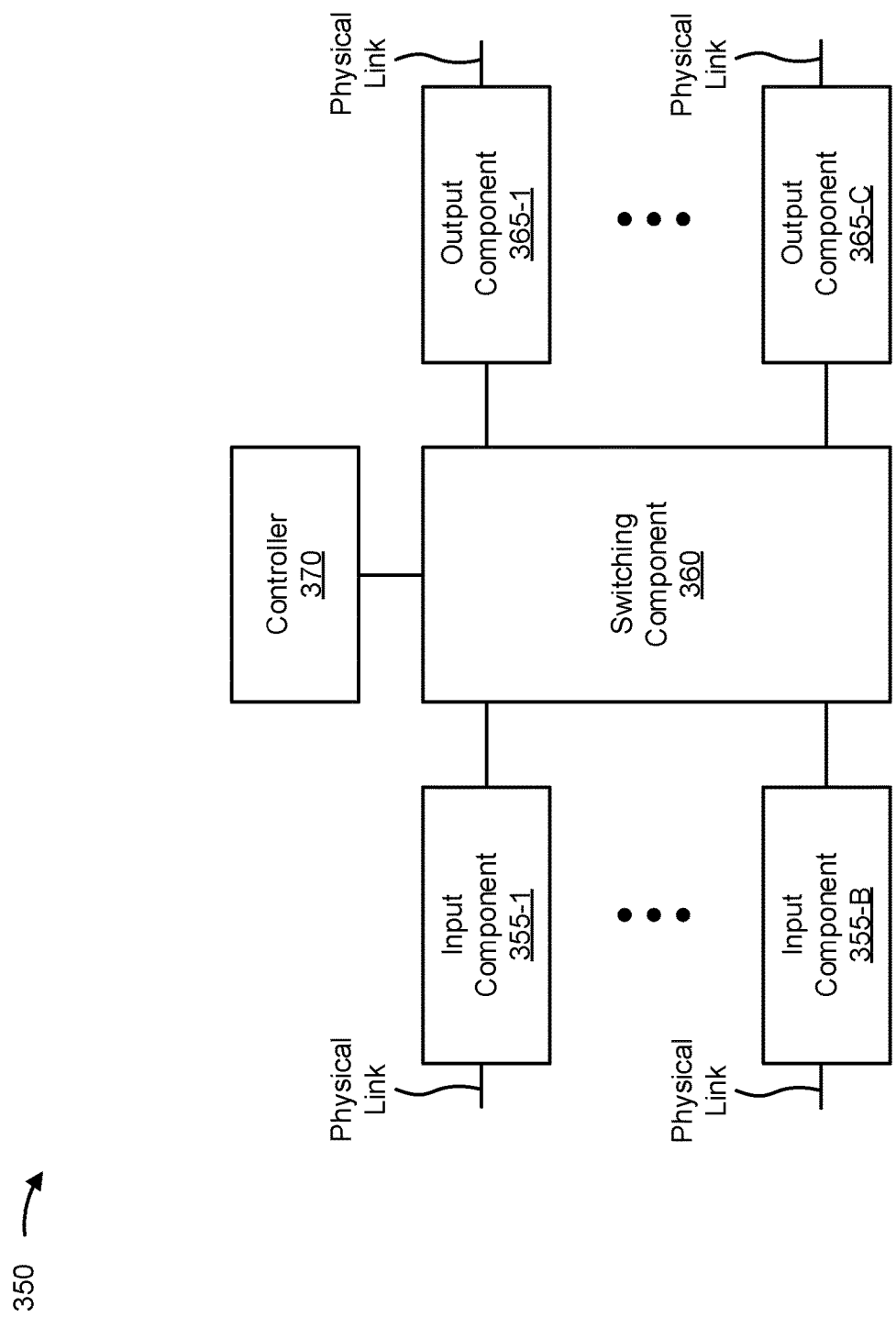

FIG. 3B is a diagram of example components of a device 350. Device 350 may correspond to leaf device 205, spine device 210, and/or core network device 215. In some implementations, leaf device 205, spine device 210, and/or core network device 215 may include one or more devices 350 and/or one or more components of device 350. As shown in FIG. 3, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor. The processor is implemented in hardware, firmware, or a combination of hardware and software. In some implementations, controller 370 may include one or more processors that can be programmed to perform a function.

In some implementations, controller 370 may include a random-access memory (RAM), a read only memory (ROM), and/or another type of dynamic or static storage device (e.g., a flash memory, a magnetic memory, an optical memory, etc.) that stores information and/or instructions for use by controller 37.

In some implementations, controller 370 may communicate with other devices, networks, and/or systems connected to device 350 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
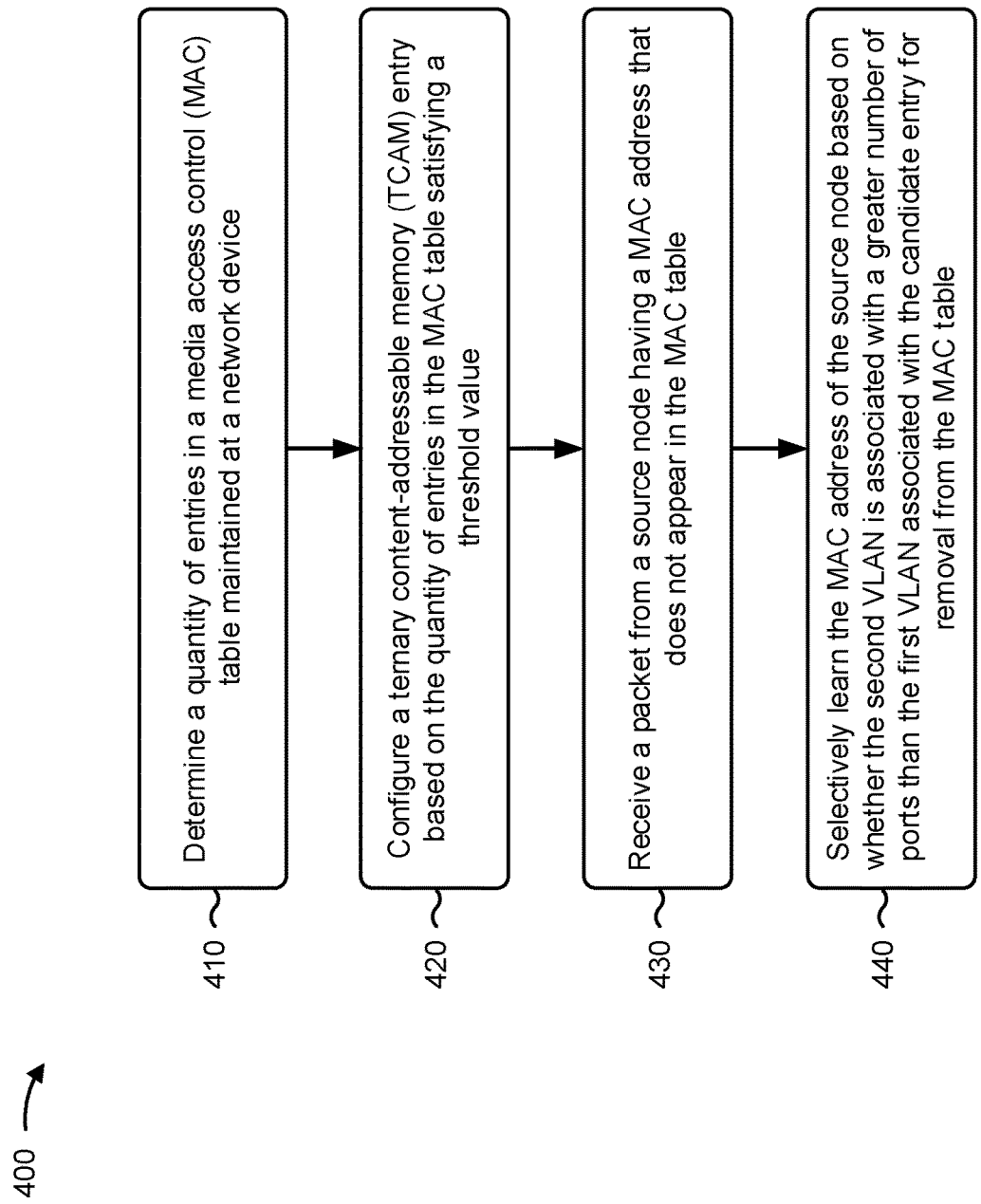
FIG. 4 is a flow chart of an example process for selective media access control (MAC) learning and purging to reduce flooding and replication in a network.

FIG. 4 is a flow chart of an example process 400 for selective media access control (MAC) learning and purging to reduce flooding and replication in a network. In some implementations, one or more process blocks of FIG. 4 may be performed by a network device (e.g., leaf device 205, spine device 210, and/or core network device 215). In some implementations, one or more process blocks of FIG. 4 may be performed by another device or a group of devices separate from or including the network device, such as a server (e.g., server 220), a host (e.g., host 225), and/or the like.

As shown in FIG. 4, process 400 may include determining a quantity of entries in a media access control (MAC) table maintained at the network device (block 410). For example, the network device (e.g., using computing resource 224, processor 310, memory 315, storage component 320, input component 325, output component 330, communication interface 335, input component 355, switching component 360, output component 365, controller 370, and/or the like) may determine a quantity of entries in a media access control (MAC) table maintained at the network device, as described above.

As further shown in FIG. 4, process 400 may include configuring a ternary content-addressable memory (TCAM) entry based on the quantity of entries in the MAC table satisfying a threshold value (block 420). For example, the network device (e.g., using processor 310, memory 315, storage component 320, and/or the like) may configure a TCAM entry based on the quantity of entries in the MAC table satisfying a threshold value, as described above. In some implementations, the TCAM entry may include an identifier for a first virtual local area network (VLAN) associated with a candidate entry for removal from the MAC table.

As further shown in FIG. 4, process 400 may include receiving a packet from a source node having a MAC address that does not appear in the MAC table (block 430). For example, the network device (e.g., using processor 310, memory 315, storage component 320, input component 325, communication interface 335, input component 355, switching component 360, controller 370, and/or the like) may receive a packet from a source node having a MAC address that does not appear in the MAC table, as described above.

In some implementations, the packet may include an identifier for a second VLAN in which the source node is a member.

As further shown in FIG. 4, process 400 may include selectively learning the MAC address of the source node based on whether the second VLAN is associated with a greater number of ports than the first VLAN associated with the candidate entry for removal from the MAC table (block 440). For example, the network device (e.g., using processor 310, memory 315, storage component 320, controller 370, and/or the like) may selectively learn the MAC address of the source node based on whether the second VLAN is associated with a greater number of ports than the first VLAN associated with the candidate entry for removal from the MAC table, as described above. In some implementations, learning the MAC address of the source node may comprise removing the candidate entry from the MAC table and inserting a new entry corresponding to the source node into the MAC table.

Process 400 may include additional implementations, such as any single implementation or any combination of implementations described below and/or in connection with one or more other processes described elsewhere herein.

In some implementations, the MAC address of the source node may be learned based on further determining that the MAC address of the source node does not appear in a purge list containing one or more entries removed from the MAC table within a threshold time. In some implementations, the packet may be a first packet and the source node may be a first source node, and the network device may receive a second packet from a second source node having a MAC address that does not appear in the MAC table, where the second packet may be received prior to the first packet, and may forward the second packet to a destination node without learning the MAC address of the second source node based on the second source node belonging to a third VLAN that is associated with fewer ports than the first VLAN associated with the candidate entry.

In some implementations, the candidate entry for removal from the MAC table may be determined based on the first VLAN associated with the candidate entry being associated with a fewest number of ports among the entries in the MAC table. In some implementations, the candidate entry for removal from the MAC table may be an oldest entry among a plurality of the entries in the MAC table that are associated with the first VLAN.

In some implementations, the network device may add a MAC address of the candidate entry to a purge list based on removing the candidate entry from the MAC table, and may forward one or more subsequent packets received from a node corresponding to the candidate entry without relearning the MAC address of the candidate entry while the MAC address of the candidate entry is in the purge list. In some implementations, the network device may remove the MAC address of the candidate entry from the purge list based on one or more of a timer expiring or one or more ports being added to the first VLAN associated with the candidate entry, where the timer may be started upon adding the MAC address of the candidate entry to the purge list.

In some implementations, the network device may reprioritize a priority queue corresponding to the entries in the MAC table based on learning the MAC address of the source node, where the priority queue may be reprioritized such that one or more of the entries, that are associated with a VLAN with a fewest number of ports, have a highest priority for removal from the MAC table, and ties among multiple ones of the entries that are associated with one or more VLANs with an equal number of ports may be broken according to an age value. In some implementations, the priority queue may be further reprioritized based on determining that one or more new ports are added to one or more VLANs.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
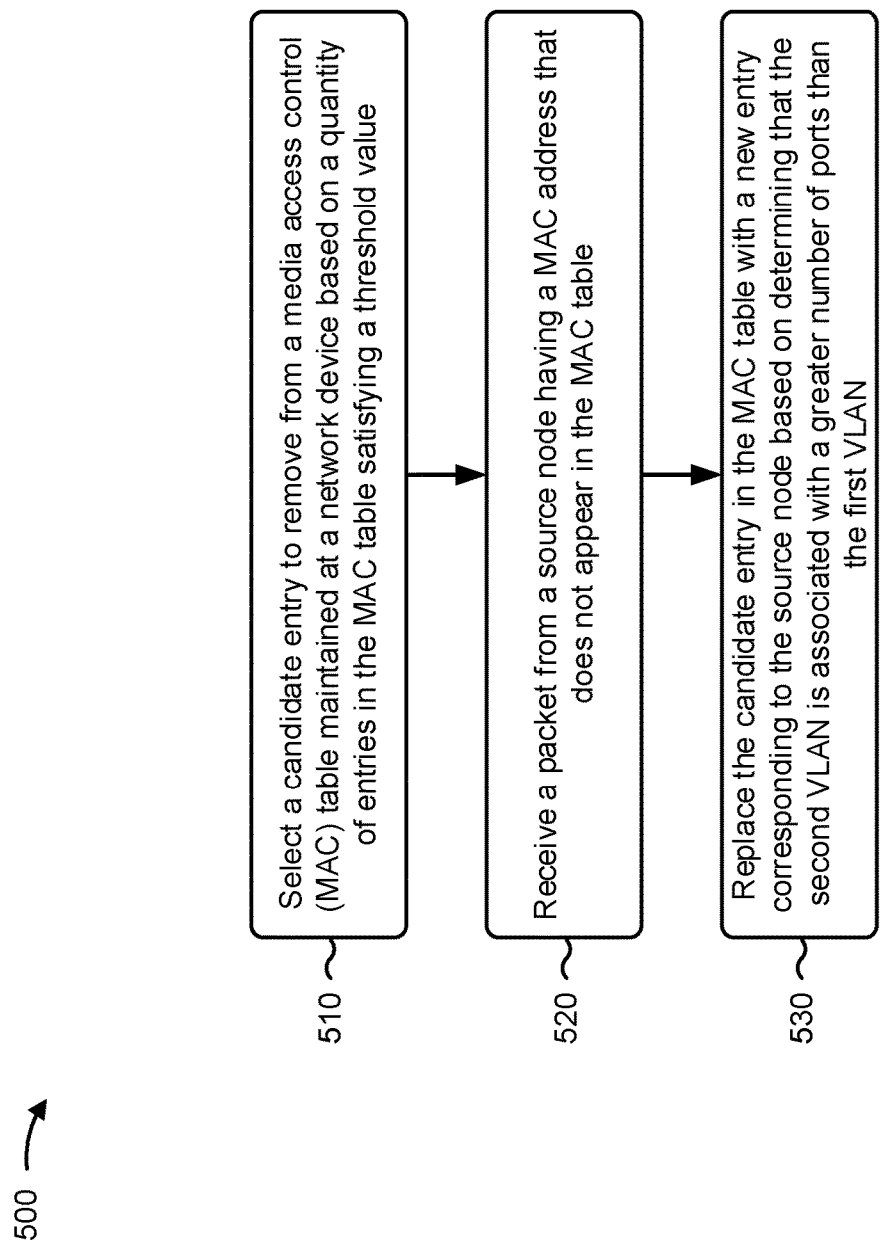
FIG. 5 is a flow chart of an example process for selective MAC learning and purging to reduce flooding and replication in a network.

FIG. 5 is a flow chart of an example process 500 for selective media access control (MAC) learning and purging to reduce flooding and replication in a network. In some implementations, one or more process blocks of FIG. 5 may be performed by a network device (e.g., leaf device 205, spine device 210, and/or core network device 215). In some implementations, one or more process blocks of FIG. 5 may be performed by another device or a group of devices separate from or including the network device, such as a server (e.g., server 220), a host (e.g., host 225), and/or the like.

As shown in FIG. 5, process 500 may include selecting a candidate entry to remove from a media access control (MAC) table maintained at the network device based on a quantity of entries in the MAC table satisfying a threshold value (block 510). For example, the network device (e.g., using processor 310, memory 315, storage component 320, input component 325, output component 330, communication interface 335, input component 355, switching component 360, output component 365, controller 370, and/or the like) may select a candidate entry to remove from a MAC table maintained at the network device based on a quantity of entries in the MAC table satisfying a threshold value, as described above. In some implementations, the candidate entry may include an identifier for a first virtual local area network (VLAN) associated with the candidate entry.

As further shown in FIG. 5, process 500 may include receiving a packet from a source node having a MAC address that does not appear in the MAC table (block 520). For example, the network device (e.g., using processor 310, memory 315, storage component 320, input component 325, communication interface 335, input component 355, switching component 360, controller 370, and/or the like) may receive a packet from a source node having a MAC address that does not appear in the MAC table, as described above. In some implementations, the packet may include an identifier for a second VLAN in which the source node is a member.

As further shown in FIG. 5, process 500 may include replacing the candidate entry in the MAC table with a new entry corresponding to the source node based on determining that the second VLAN is associated with a greater number of ports than the first VLAN (block 530). For example, the network device (e.g., using processor 310, memory 315, storage component 320, controller 370, and/or the like) may replace the candidate entry in the MAC table with a new entry corresponding to the source node based on determining that the second VLAN is associated with a greater number of ports than the first VLAN, as described above.

Process 500 may include additional implementations, such as any single implementation or any combination of implementations described below and/or in connection with one or more other processes described elsewhere herein.

In some implementations, the network device may receive a second packet having a destination MAC address that corresponds to the candidate entry, and may flood the second packet on each port associated with a VLAN identified in the second packet except a port on which the second packet was received based on the second packet having the destination MAC address that corresponds to the candidate entry. In some implementations, the candidate entry may be replaced with the new entry based on further determining that an entry corresponding to the source node was not removed from the MAC table within a threshold time period. In some implementations, the candidate entry may be an oldest entry among a plurality of the entries in the MAC table that are associated with the first VLAN.

In some implementations, the network device may start a timer upon replacing the candidate entry with the new entry, and may forward one or more subsequent packets received from a node corresponding to the candidate entry before the timer has expired without relearning the MAC address of the candidate entry. In some implementations, the network device may reprioritize a priority queue corresponding to the entries in the MAC table based on determining that one or more events have occurred, where the priority queue may be reprioritized such that an oldest entry among one or more of the entries, that are associated with a VLAN with a fewest number of ports, has a highest priority for removal from the MAC table.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
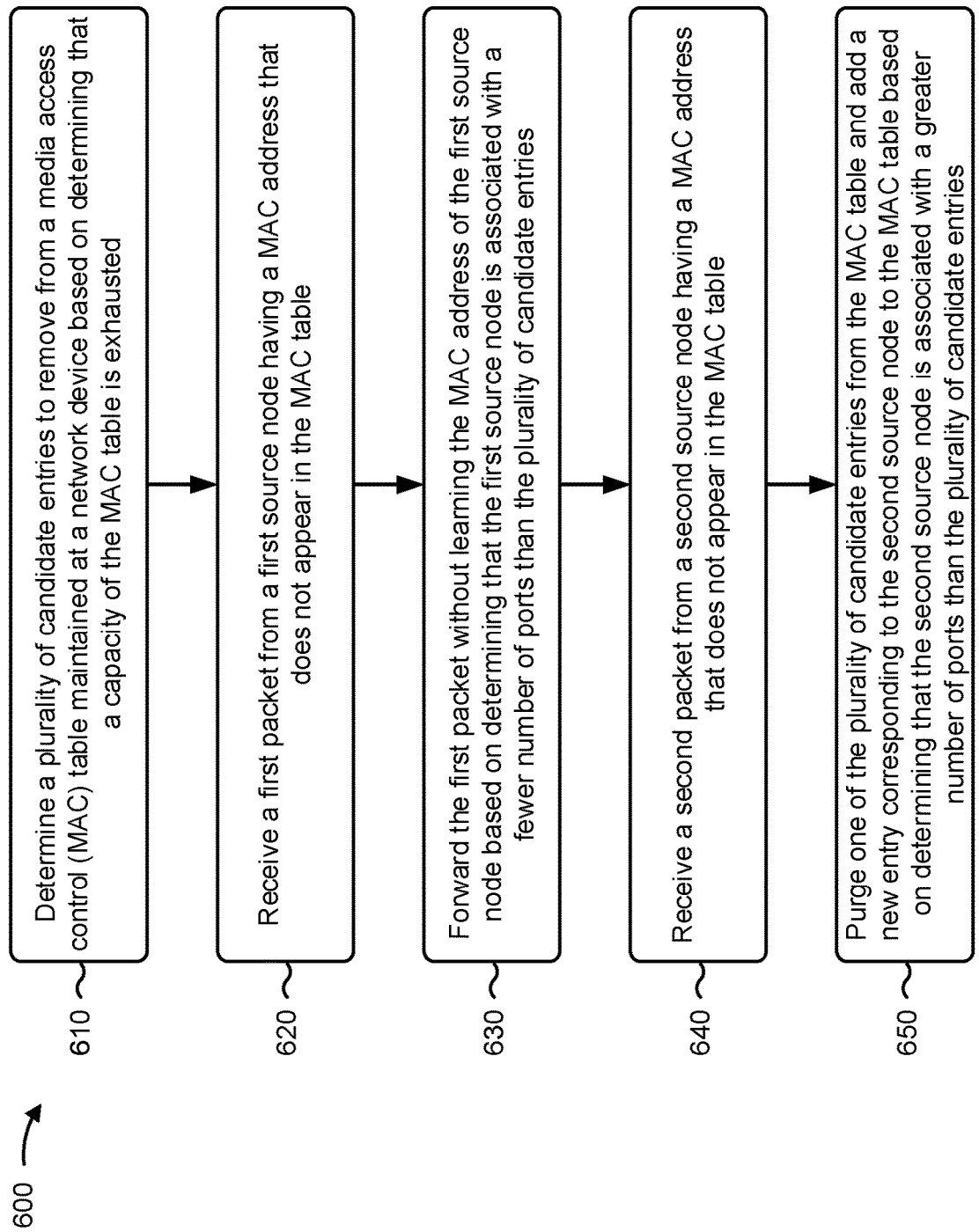
FIG. 6 is a flow chart of an example process for selective MAC learning and purging to reduce flooding and replication in a network.

FIG. 6 is a flow chart of an example process 600 for selective media access control (MAC) learning and purging to reduce flooding and replication in a network. In some implementations, one or more process blocks of FIG. 6 may be performed by a network device (e.g., leaf device 205, spine device 210, and/or core network device 215). In some implementations, one or more process blocks of FIG. 6 may be performed by another device or a group of devices separate from or including the network device, such as a server (e.g., server 220), a host (e.g., host 225), and/or the like.

As shown in FIG. 6, process 600 may include determining a plurality of candidate entries to remove from a media access control (MAC) table maintained at the network device based on determining that a capacity of the MAC table is exhausted (block 610). For example, the network device (e.g., using processor 310, memory 315, storage component 320, input component 325, output component 330, communication interface 335, input component 355, switching component 360, output component 365, controller 370, and/or the like) may determine a plurality of candidate entries to remove from a MAC table maintained at the network device based on determining that a capacity of the MAC table is exhausted, as described above. In some implementations, each of the plurality of candidate entries may be associated with a quantity of ports that is fewest among the entries in the MAC table.

As further shown in FIG. 6, process 600 may include receiving a first packet from a first source node having a MAC address that does not appear in the MAC table (block 620). For example, the network device (e.g., using processor 310, memory 315, storage component 320, input component 325, communication interface 335, input component 355, switching component 360, controller 370, and/or the like) may receive a first packet from a first source node having a MAC address that does not appear in the MAC table, as described above.

As further shown in FIG. 6, process 600 may include forwarding the first packet without learning the MAC address of the first source node based on determining that the first source node is associated with a fewer number of ports than the plurality of candidate entries (block 630). For example, the network device (e.g., using processor 310, memory 315, storage component 320, output component 330, communication interface 335, switching component 360, output component 365, controller 370, and/or the like) may forward the first packet without learning the MAC address of the first source node based on determining that the first source node is associated with a fewer number of ports than the plurality of candidate entries, as described above.

As further shown in FIG. 6, process 600 may include receiving a second packet from a second source node having a MAC address that does not appear in the MAC table (block 640). For example, the network device (e.g., using processor 310, memory 315, storage component 320, input component 325, communication interface 335, input component 355, switching component 360, controller 370, and/or the like) may receive a second packet from a second source node having a MAC address that does not appear in the MAC table, as described above.

As further shown in FIG. 6, process 600 may include purging one of the plurality of candidate entries from the MAC table and add a new entry corresponding to the second source node to the MAC table based on determining that the second source node is associated with a greater number of ports than the plurality of candidate entries (block 650). For example, the network device (e.g., using processor 310, memory 315, storage component 320, controller 370, and/or the like) may purge one of the plurality of candidate entries from the MAC table and add a new entry corresponding to the second source node to the MAC table based on determining that the second source node is associated with a greater number of ports than the plurality of candidate entries, as described above.

Process 600 may include additional implementations, such as any single implementation or any combination of implementations described below and/or in connection with one or more other processes described elsewhere herein.

In some implementations, the network device may receive a third packet from a third source node having a MAC address that does not appear in the MAC table, and may forward the third packet without learning the MAC address of the third source node based on determining that the MAC address of the third source node appears in a purge list containing one or more entries removed from the MAC table within a threshold time period. In some implementations, the network device may determine that the capacity of the MAC table is exhausted based on a quantity of entries in the MAC table satisfying a threshold value.

In some implementations, each of the plurality of candidate entries may be associated with a respective virtual local area network (VLAN) for which the quantity of ports is fewest among the entries in the MAC table. In some implementations, the network device may add the one of the plurality of candidate entries to a purge list, and may remove the one of the plurality of candidate entries from the purge list based on one or more of a timer expiring or one or more ports being added to a VLAN associated with the one of the plurality of candidate entries.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
 determining, at a network device, a quantity of entries in a media access control (MAC) table maintained at the network device;
 configuring, by the network device, a plurality of ternary content-addressable memory (TCAM) entries of a TCAM based on the quantity of entries in the MAC table satisfying a threshold value,
  wherein a TCAM entry, of the plurality of TCAM entries, includes an identifier for a first virtual local area network (VLAN) associated with a candidate entry from the MAC table, and
  wherein the TCAM is implemented at a data plane separate from a content-addressable memory (CAM) that contains the MAC table;
receiving, at the network device, a packet from a source node having a MAC address that does not appear in the MAC table,
  wherein the packet includes an identifier for a second VLAN in which the source node is a member;
selectively learning, by the network device, the MAC address of the source node based on whether the second VLAN is associated with a greater number of ports than the first VLAN associated with the candidate entry from the MAC table,
wherein learning the MAC address of the source node comprises removing the candidate entry from the MAC table and inserting a new entry corresponding to the source node into the MAC table; and
removing, by the network device and from the data plane, the TCAM entry corresponding to the removed candidate entry from the MAC table when a quantity of empty entries in the MAC table satisfies a threshold value.

2. The method of claim 1, wherein the MAC address of the source node is learned based on further determining that the MAC address of the source node does not appear in a purge list containing one or more entries removed from the MAC table within a threshold time period.

3. The method of claim 1, wherein the packet is a first packet and the source node is a first source node;
  wherein the method further comprises:
  receiving a second packet from a second source node having a MAC address that does not appear in the MAC table,
    wherein the second packet is received prior to the first packet; and
  forwarding the second packet to a destination node without learning the MAC address of the second source node based on the second source node belonging to a third VLAN that is associated with fewer ports than the first VLAN associated with the candidate entry.

4. The method of claim 1, wherein the candidate entry for removal from the MAC table is determined based on the first VLAN associated with the candidate entry being associated with a fewest number of ports among the entries in the MAC table.

5. The method of claim 4, wherein the candidate entry for removal from the MAC table is an oldest entry among a plurality of the entries in the MAC table that are associated with the first VLAN.

6. The method of claim 1, further comprising:
adding a MAC address of the candidate entry to a purge list based on removing the candidate entry from the MAC table; and
forwarding one or more subsequent packets received from a node corresponding to the candidate entry without relearning the MAC address of the candidate entry while the MAC address of the candidate entry is in the purge list.

7. The method of claim 6, further comprising:
removing the MAC address of the candidate entry from the purge list based on one or more of a timer expiring or one or more ports being added to the first VLAN associated with the candidate entry,
  wherein the timer is started upon adding the MAC address of the candidate entry to the purge list.

8. The method of claim 1, further comprising:
reprioritizing a priority queue corresponding to the entries in the MAC table based on learning the MAC address of the source node,
  wherein the priority queue is reprioritized such that one or more of the entries, that are associated with a VLAN with a fewest number of ports, have a highest priority for removal from the MAC table and ties among multiple ones of the entries that are associated with one or more VLANs with an equal number of ports are broken according to an age value.

9. The method of claim 8, wherein the priority queue is further reprioritized based on determining that one or more new ports are added to one or more VLANs.

10. A network device, comprising:
one or more memories; and
one or more processors to:
  select a candidate entry to remove from a media access control (MAC) table maintained at the network device based on a quantity of entries in the MAC table satisfying a threshold value,
    wherein the candidate entry includes an identifier for a first virtual local area network (VLAN) associated with the candidate entry;
  configure a plurality of ternary content-addressable memory (TCAM) entries of a TCAM based on the quantity of entries in the MAC table satisfying the threshold value,
    wherein a TCAM entry, of the plurality of TCAM entries, includes the identifier for the first VLAN associated with the candidate entry from the MAC table, and
    wherein the TCAM is implemented at a data plane separate from a content-addressable memory (CAM) that contains the MAC table,
  receive a packet from a source node having a MAC address that does not appear in the MAC table,
    wherein the packet includes an identifier for a second VLAN in which the source node is a member; and
  replace the candidate entry in the MAC table with a new entry corresponding to the source node based on determining that the second VLAN is associated with a greater number of ports than the first VLAN; and
  remove, from the data plane, the TCAM entry corresponding to the replaced candidate entry from the MAC table when a quantity of empty entries in the MAC table satisfies a threshold value.

11. The network device of claim 10, wherein the packet is a first packet; and
wherein the one or more processors are further to:
  receive a second packet having a destination MAC address that corresponds to the candidate entry; and
  flood the second packet on each port associated with a VLAN identified in the second packet except a port on which the second packet was received based on the second packet having the destination MAC address that corresponds to the candidate entry.

12. The network device of claim 10, wherein the candidate entry is to be replaced with the new entry based on further determining that an entry corresponding to the source node was not removed from the MAC table within a threshold time period.

13. The network device of claim 10, wherein the candidate entry is an oldest entry among a plurality of the entries in the MAC table that are associated with the first VLAN.

14. The network device of claim 10, wherein the one or more processors are further to:
reprioritize a priority queue corresponding to the entries in the MAC table based on determining that one or more events have occurred,
wherein the priority queue is reprioritized such that an oldest entry among one or more of the entries, that are associated with a VLAN with a fewest number of ports, has a highest priority for removal from the MAC table.

15. The network device of claim 10, wherein the one or more processors are further to:
start an aging timer upon replacing the candidate entry with the new entry; and
forward one or more subsequent packets received from a node corresponding to the candidate entry before the aging timer has expired without relearning the MAC address of the candidate entry,
wherein a maximum time of the aging timer is based on how frequently the second VLAN transmits packets.

16. A non-transitory computer-readable medium storing instructions, the instructions comprising:
one or more instructions that, when executed by one or more processors of a network device, cause the one or more processors to:
determine a plurality of candidate entries to remove from a media access control (MAC) table maintained at the network device based on determining that a capacity of the MAC table is exhausted,
wherein each of the plurality of candidate entries is associated with a quantity of ports that is fewest among entries in the MAC table;
configure a plurality of ternary content-addressable memory (TCAM) entries of a TCAM based on the capacity of the MAC table being exhausted,
wherein a TCAM entry, of the plurality of TCAM entries, includes an identifier for a virtual local area network (VLAN) associated with a candidate entry, of the plurality of candidate entries, from the MAC table, and
wherein the TCAM is implemented at a data plane separate from a content-addressable memory (CAM) that contains the MAC table;
receive a first packet from a first source node having a MAC address that does not appear in the MAC table;
forward the first packet without learning the MAC address of the first source node based on determining that the first source node is associated with a fewer number of ports than the plurality of candidate entries;
receive a second packet from a second source node having a MAC address that does not appear in the MAC table;
purge the candidate entry from the MAC table and add a new entry corresponding to the second source node to the MAC table based on determining that the second source node is associated with a greater number of ports than the plurality of candidate entries; and
remove, from the data plane, the TCAM entry corresponding to the purged candidate entry from the MAC table when a quantity of empty entries in the MAC table satisfies a threshold value.

17. The non-transitory computer-readable medium of claim 16, wherein the one or more instructions, when executed by the one or more processors, further cause the one or more processors to:
receive a third packet from a third source node having a MAC address that does not appear in the MAC table; and
forward the third packet without learning the MAC address of the third source node based on determining that the MAC address of the third source node appears in a purge list containing one or more entries removed from the MAC table within a threshold time period.

18. The non-transitory computer-readable medium of claim 16, wherein the one or more instructions, when executed by the one or more processors, further cause the one or more processors to:
determine that the capacity of the MAC table is exhausted based on a quantity of entries in the MAC table satisfying a threshold value.

19. The non-transitory computer-readable medium of claim 16, wherein each of the plurality of candidate entries is associated with a respective VLAN for which the quantity of ports is fewest among the entries in the MAC table.

20. The non-transitory computer-readable medium of claim 16, wherein the one or more instructions, when executed by the one or more processors, further cause the one or more processors to:
add another one of the plurality of candidate entries to a purge list; and
remove the other one of the plurality of candidate entries from the purge list based on one or more ports being added to the VLAN.

* * * * *